A. W. BENJAMIN.
AUTOMOBILE.
APPLICATION FILED FEB. 2, 1910.
980,185.
Patented Jan. 3, 1911.
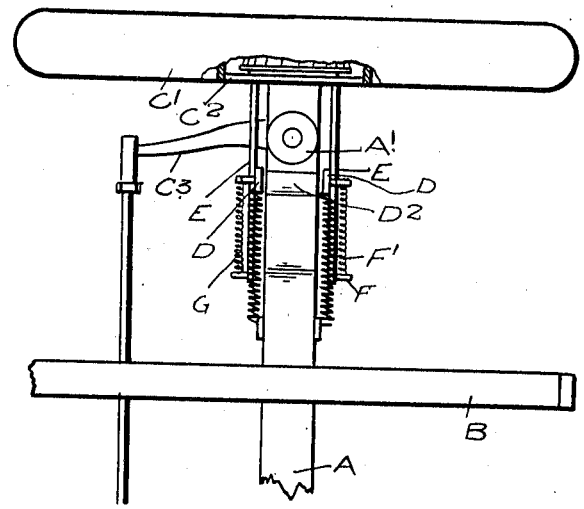
FIG. 1.
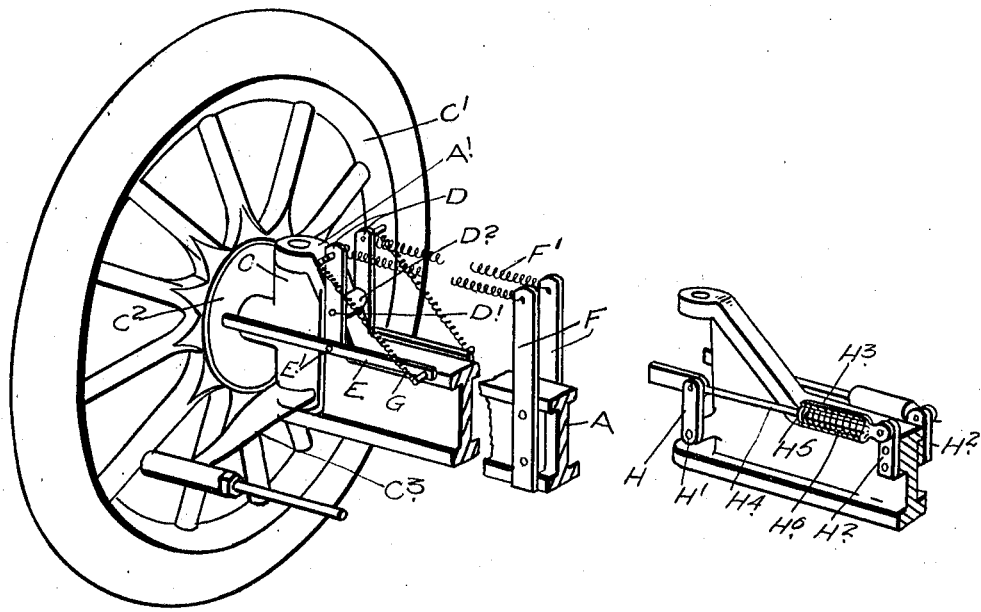
FIG. 2.
FIG. 3.
WITNESSES.
H. I. S. Young.
Edward N. Garton.
INVENTOR
A. W. BENJAMIN.
by
Fred B. Felkerstenlaugh
ATT'Y

UNITED STATES PATENT OFFICE.

ALBERT WESLEY BENJAMIN, OF YARKER, ONTARIO, CANADA.

AUTOMOBILE.

980,185.  Specification of Letters Patent.  Patented Jan. 3, 1911.

Application filed February 2, 1910. Serial No. 541,530.

*To all whom it may concern:*

Be it known that I, ALBERT WESLEY BENJAMIN, of the village of Yarker, in the county of Addington, in the Province of Ontario, Canada, have invented certain new and useful Improvements in Automobiles, of which the following is the specification.

My invention relates to improvements in automobiles, and the object of the invention is to devise a means whereby should any parts or portion of the steering-gear become broken or disabled, the wheels will automatically be restored to track with the rear wheels and thereby insure of the car running straight, until it can be stopped conveniently.

Figure 1, is a plan view of an automobile wheel and a portion of the axle connected thereto and shows my device in position. Fig. 2, is a perspective detail view of the parts shown in Fig. 1. Fig. 3, is a perspective detail view of an alternative form of my device.

In the drawings like letters of reference indicate corresponding parts in each figure.

A is a portion of the front axle of an automobile.

B is a portion of the supporting spring of the automobile which is connected to the front axle.

The front axle A is provided with the usual forked end $A^1$ between the arms of which is connected the vertical portion C connected with the automobile wheel $C^1$. The wheel $C^1$ is provided with the usual bearing box $C^2$. The steering arm $C^3$ is connected with the portion C against which the hub bears and through which the stub axle passes.

D are a pair of arms pivotally connected intermediately of their length by a cross pin $D^1$ extending through a suitable portion such as $D^2$ of the axle.

E is a horizontal plunger bar arranged parallel with the aforesaid axle and pivotally connected to the lower end of the arms D by a pin $E^1$. The outer ends of the bars E bear against the inner face of the wheel boxing $C^2$ as will be seen on referring particularly to Fig. 1.

F are vertical standards secured on the axle of the automobile at a suitable distance from the end thereof.

$F^1$ are spiral springs which extend between the arms D and the standards F. Such springs tend to draw the upper ends of the arms inwardly and force the lower ends of the arms and horizontal bars E outwardly so as to press against the wheel boxing $C^2$ at each side of the pivot joint connection to the axle.

G are springs connecting the upper ends of the arms D with the inner ends of the bars E so as to hold such bars in proper relative position. It will thus be seen from this description that should the steering gear become broken when in operation the pressure of the plunger bars E upon the bearing box at each side of the pivot joint connection would have a tendency to force the wheel into a position in alinement with the rear wheel so as to track therewith thereby insuring that the automobile travels in a direct line forwardly after breaking the steering gear until the automobile is brought to a stand still in the usual way.

In Fig. 2 I show an alternative form in which H are links pivotally connected by pins $H^1$ at the bottom to a suitable portion of the axle.

$H^2$ are standard bars secured to each side of the axle at a suitable distance from the fork thereof.

$H^3$ are sleeves pivotally connected at their inner ends to the standards $H^2$ and $H^4$ are plunger rods extending into the said sleeves at their inner ends and pivotally connected in proximity to their outer ends to the upper ends of the links H. The outer ends are designed to bear against the boxing of the wheel in a similar manner to that described with reference to Figs. 1 and 2.

$H^5$ is a washer secured on the rod $H^4$ and $H^6$ is a spiral spring extending between such washer and the inner end of the sleeve $H^3$. By this means when the wheel is drawn out of alinement by the steering gear the spiral springs $H^3$ are compressed so that, should the steering gear be broken, such compressed springs tend to force the front wheels into alinement with the rear wheels.

From this description it will be seen that I have devised a very simple means whereby should the steering gear of an automobile become broken the front wheels may be automatically brought back into alinement with the rear wheels after having been moved out of alinement by the steering gear so that the front and rear wheels track one with the other and carry the automobile in a direct line forwardly.

What I claim as my invention is:

1. In an automobile, the combination with the front axle and the front automobile wheels provided with the usual bearing box and the pivot joint connections between such wheels and the axle, of spring plunger rods secured to the axle and bearing against the aforesaid box on the wheel at each side of the pivot joint connection, as and for the purpose specified.

2. In an automobile, the combination with the front axle, the automobile front wheels each provided with a suitable bearing box and a pivot joint connection between the wheel and the axle, of lever arms pivotally connected intermediately of their length to each end of the axle, horizontal plunger bars pivotally connected to the lower end of each of the levers and bearing at their outer ends against the wheel boxing, of spring connections between the upper ends of the lever arms and the inner ends of the plungers and spring connections between the upper ends of the lever arms and a suitable portion of the axle, as and for the purpose specified.

ALBERT WESLEY BENJAMIN.

Witnesses:
J. LEONARD GARDINER,
R. B. GILBERT.